United States Patent
Beard et al.

(10) Patent No.: US 10,795,815 B2
(45) Date of Patent: Oct. 6, 2020

(54) METHOD AND APPARATUS FOR MAINTAINING DATA COHERENCE IN A NON-UNIFORM COMPUTE DEVICE

(71) Applicant: ARM Limited, Cambridge (GB)

(72) Inventors: Jonathan Curtis Beard, Austin, TX (US); Wendy Elsasser, Austin, TX (US); Stephan Diestelhorst, Austin, TX (US)

(73) Assignee: ARM Limited, Cambridge (GB)

( * ) Notice: Subject to any disclaimer, the term of this patent is extended or adjusted under 35 U.S.C. 154(b) by 687 days.

(21) Appl. No.: 15/166,458

(22) Filed: May 27, 2016

(65) Prior Publication Data

US 2017/0344480 A1 Nov. 30, 2017

(51) Int. Cl.
*G06F 12/0815* (2016.01)
*G06F 12/0811* (2016.01)
(Continued)

(52) U.S. Cl.
CPC .......... *G06F 12/0815* (2013.01); *G06F 12/08* (2013.01); *G06F 12/084* (2013.01);
(Continued)

(58) Field of Classification Search
CPC ............ G06F 15/7821; G06F 12/0815; G06F 12/0811; G06F 12/084; G06F 12/08; G06F 9/3842
See application file for complete search history.

(56) References Cited

U.S. PATENT DOCUMENTS 5,938,722 A 8/1999 Johnson
6,192,451 B1* 2/2001 Arimilli .............. G06F 12/0831
711/122
(Continued)

FOREIGN PATENT DOCUMENTS

WO WO 2010/141222 12/2010
WO WO 2010/141224 12/2010

OTHER PUBLICATIONS

Ghasempour, Mohsen, et al. "DReAM: Dynamic Re-arrangement of Address Mapping to Improve the Performance of DRAMs." arXiv preprint arXiv:1509.03721 (2015).
(Continued)

*Primary Examiner* — Reginald G Bragdon
*Assistant Examiner* — Curtis James Kortman
(74) *Attorney, Agent, or Firm* — Leveque IP Law, P.C.

(57) ABSTRACT

A data processing apparatus includes one or more host processors with first processing units, one or more caches with second processing unit, a non-cache memory having a third processing unit and a reorder buffer operable to maintain data order during execution of a program of instructions. An instruction scheduler routes instructions to the processing units. Data coherence is maintained by control logic that blocks access to data locations in use by a selected processing unit other than the selected processing unit until data associated with the data locations are released from the reorder buffer. Data stored in the cache is written to the memory if it is already in a modified state, otherwise the state is set to the modified state. A memory controller may be used to restrict access to memory locations to be operated on.

15 Claims, 12 Drawing Sheets

(51) Int. Cl.
*G06F 12/084* (2016.01)
*G06F 12/08* (2016.01)
*G06F 15/78* (2006.01)
*G06F 9/38* (2018.01)

(52) U.S. Cl.
CPC ...... *G06F 12/0811* (2013.01); *G06F 15/7821* (2013.01); *G06F 9/3842* (2013.01)

(56) References Cited

U.S. PATENT DOCUMENTS

| | | | |
|---|---|---|---|
| 6,467,009 | B1 | 10/2002 | Winegarden et al. |
| 6,629,233 | B1 | 9/2003 | Kahle |
| 6,691,222 | B2 | 2/2004 | Janik et al. |
| 8,555,053 | B1 | 10/2013 | Vitalo et al. |
| 9,489,659 | B1 | 11/2016 | Liu et al. |
| 2002/0007450 | A1 | 1/2002 | Witt |
| 2002/0188819 | A1 | 12/2002 | Benedix |
| 2005/0050303 | A1 | 3/2005 | Rosner et al. |
| 2008/0201563 | A1* | 8/2008 | Dale ............... G06F 9/3824 712/234 |
| 2009/0083720 | A1 | 3/2009 | Bohizic et al. |
| 2010/0088457 | A1 | 4/2010 | Goodrich et al. |
| 2010/0115233 | A1 | 5/2010 | Brewer |
| 2010/0333098 | A1 | 12/2010 | Jordan |
| 2013/0282987 | A1 | 10/2013 | Koob et al. |
| 2014/0032856 | A1 | 1/2014 | Avudaiyappan et al. |
| 2014/0122848 | A1 | 5/2014 | Easwaran |
| 2014/0365734 | A1* | 12/2014 | Bridge, Jr. .......... G06F 12/0891 711/144 |
| 2015/0127928 | A1 | 5/2015 | Burger et al. |
| 2015/0277925 | A1 | 10/2015 | Sleiman et al. |

OTHER PUBLICATIONS

Zhang, Dong Ping, et al. "A new perspective on processing-in-memory architecture design." Proceedings of the ACM SIGPLAN Workshop on Memory Systems Performance and Correctness. ACM, 2013.

Elliott, Duncan G., et al. "Computational RAM: implementing processors in memory." Design & Test of Computers, IEEE 16.1 (1999): 32-41.

Balasubramonian, Rajeev, et al. "Near-data processing: Insights from a MICRO-46 workshop." Micro, IEEE 34.4 (2014): 36-42.

Zhang, Lixin, et al. "The impulse memory controller." Computers, IEEE Transactions on 50.11 (2001): 1117-1132.

Ahn, Junwhan, et al. "Pim-enabled instructions: A low-overhead, locality-aware processing-in-memory architecture." Computer Architecture (ISCA), 2015 ACM/IEEE 42nd Annual International Symposium on. IEEE, 2015.

Hall, Mary, et al. "Mapping irregular applications to DIVA, a PIM-based data-intensive architecture." Proceedings of the 1999 ACM/IEEE conference on Supercomputing. ACM, 1999.

Gokhale, Maya, Bill Holmes, and Ken Iobst. "Processing in memory: The Terasys massively parallel PIM array." Computer 28.4 (1995): 23-31.

Brockman et al., "microservers", Proceedings of the 13th International Con. on Supercomputing, ICS '99, May 1, 1999, pp. 454-463.

Chu, Slo-Li. "Critical Block Scheduling: A Thread-Level Parallelizing Mechanism for a Heterogeneous Chip Multiprocessor Architecture." LCPC (2007), pp. 261-275.

* cited by examiner

METHOD AND APPARATUS FOR MAINTAINING DATA COHERENCE IN A NON-UNIFORM COMPUTE DEVICE

STATEMENT REGARDING FEDERALLY SPONSORED RESEARCH OR DEVELOPMENT

This invention was made with Government support under the Fast Forward 2 contract awarded by DOE. The Government has certain rights in this invention.

CROSS-REFERENCE TO RELATED APPLICATION

This application is related to the following co-pending U.S. patent applications: application Ser. No. 15/166,444 entitled "METHOD AND APPARATUS FOR SCHEDULING IN A NON-UNIFORM COMPUTE DEVICE" and application Ser. No. 15/166,467 entitled "METHOD AND APPARATUS FOR REORDERING IN A NON-UNIFORM COMPUTE DEVICE", all filed on even date herewith, which are incorporated herein in their entirety.

BACKGROUND

Data processing systems, such as a System-on-a-Chip (SoC), may contain multiple processor hosts, multiple data caches and shared data resources. The multiple hosts typically have identical or at least similar processing capabilities, so such a system may be termed a Uniform Compute Device. Data to be processed is retrieved from a shared data resources and is moved up to the highest level cache (level one or L1) for processing. Processing results are be moved down to the lowest level cache and then stored in a shared data resource. A result of this approach is that processing is delayed when the required data is not available and must be retrieved from a shared data resource or lower level cache.

An alternative approach is to add "processing-in-memory" (PIM) elements, also called "compute-near-memory" (CNM) elements or the like. In this approach, logic elements and memory elements (such as dynamic random access memory (DRAM)) are integrated in a common integrated circuit. The logic elements execute separate PIM instructions that are created prior to execution. A special processing unit for managing these instructions is added next to each host and a PIM monitor is added next to the last level cache. In this approach, the data paths of the PIM instructions are separated from the normal instructions. In turn, this requires significant communication between hosts, the monitor and the special processing units. A significant disadvantage of this approach is that it does not fully utilize the resources provided by the host processor. For example, if the accessed data has poor data locality, the scheduler will still send the PIM instructions to execute in (near) memory, even though the host is idle and processing units in memory are fully occupied. In addition, the PIM instructions are executed atomically, without speculation.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
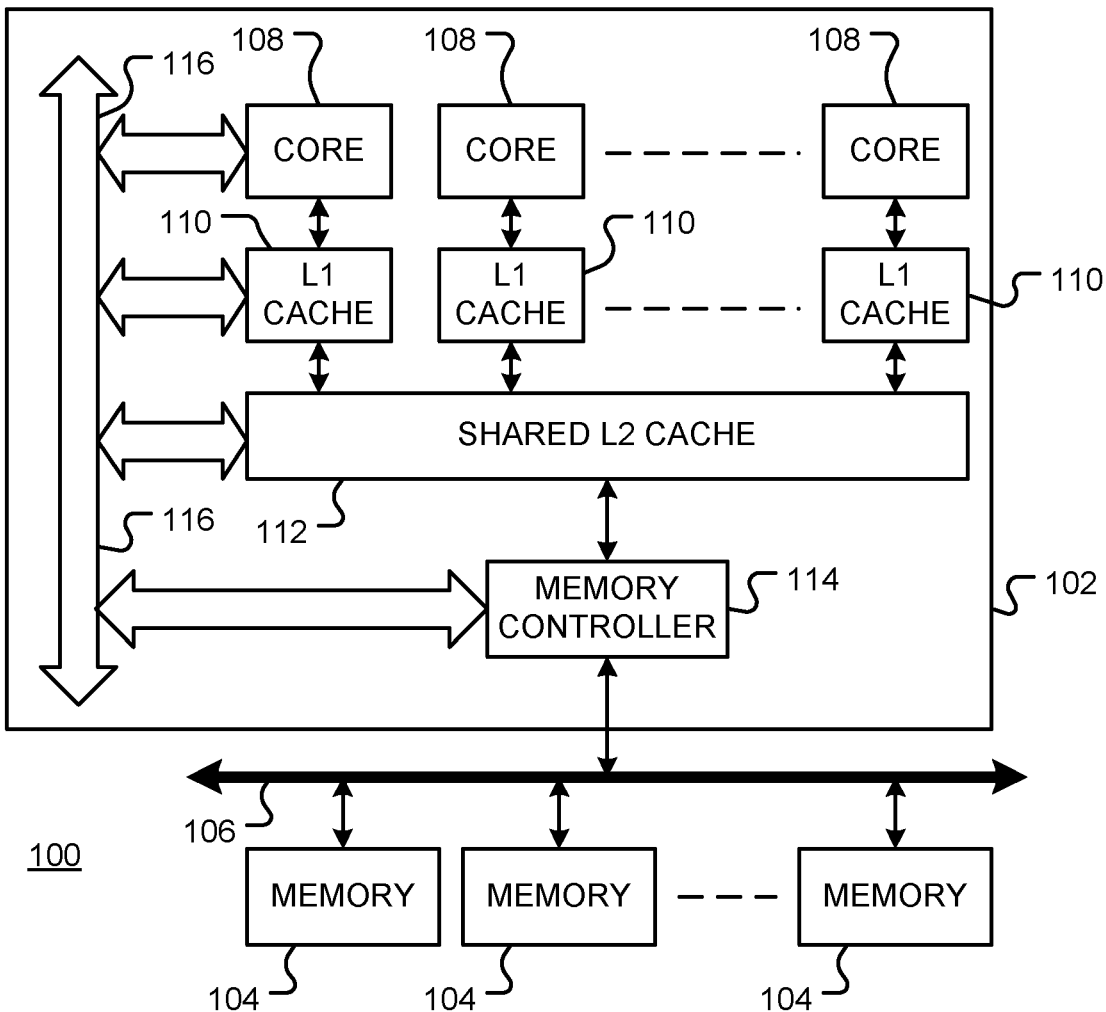
FIG. 1 is a block diagram of a data processing system, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to a data processing architecture that integrates near memory processing units into a conventional processing architecture. The near memory processing units operate as remote functional units of one or more host or host processors. Near memory processing units may also interact with multiple other near memory processing units before synchronizing with a host processor. Interaction with a host processor and/or other host processors could take place via any type of communications link (e.g., shared memory, bus, TCP, RDMA). The resulting device is referred to herein as a Non-uniform Compute Device (NUCD), in contrast to a multi-host device in which computation capability is uniformly distributed among the hosts.

In accordance with various embodiment, the data processing architecture includes a multi-level memory system, one or more host processors each having a first processing unit, and one or more second processing units. The one or more host processors are coupled to the multi-level memory system at a first level, such as an L1 cache of the memory system for example. The second processing units are coupled to the memory system at a second level, such as a cache or a memory, for example. At least one of the host processors includes an instruction scheduler that routes instructions selectively to at least one of the first and second processing units, dependent upon the availability of the processing units and the location of data to be used when executing the instructions.

In accordance with various embodiments, a method of processing data is provided for a non-uniform compute device (NUCD) comprising a multi-level memory system, a host processor having a first processing unit coupled to a first level of the memory system, and one or more second processing units (NUCD modules) coupled to the memory system at a second level. The NUCD is configured to execute a program of instructions that include NUCD blocks, comprising NUCD instructions, to be executed and an NUCD marker descriptive of requirements for executing the NUCD instructions. Instructions are sequentially fetched and decoded. When a decoded instruction indicates an NUCD block, an associated NUCD marker is fetched and decoded. When none of the second processing units capable of satisfying the requirements are available, the NUCD marker is removed and the block of NUCD instructions is issued to the first processing unit. When one or more of the second processing units capable of satisfying the requirements are available, an NUCD execution packet is generated, indicative of the NUCD instructions and input data, an entry is allocated in an instruction queue. When a second processing unit is available and capable of satisfying the requirements, the NUCD execution packet is issued to the second processing unit, and when the second processing unit is incapable of satisfying the requirements.

The NUCD block may include a "start segment" instruction, "NUCD start" instruction, or equivalent, which indicates a start of the NUCD block. In some embodiments, an NUCD block may include an instruction specific to an NUCD capability.

The cache may comprise a multi-level cache having a plurality of caches, with each having a second processing unit. In this embodiment, the NUCD execution packet may be issued to all the second processing units coupled to the multi-level cache at the same time.

NUCD execution packets may be issued by adding the NUCD execution packet to one or more instruction queues for the second processing units.

The NUCD marker may include one or more of: compiled input registers used in the NUCD instructions, an indicator of execution loops within the NUCD instructions that have not been unrolled, indicators of computational requirements, and the size of the NUCD block.

When an entry is added to an instruction queue, a corresponding entry may be allocated in a reorder buffer to enable data order to be maintained.

The NUCD execution packet may include a pointer to NUCD instructions stored in an instruction cache or the instructions themselves.

In accordance with various embodiments, a data processing apparatus for executing a program of instruction is provided. The data processing apparatus includes: a multi-level memory system having a first level and one or more second levels, one or more host processors, each having a first processing unit, and one or more second processing units. The first level of the memory system may comprise a cache (such as an L1 cache, for example) that is accessible by a first processing unit. Each of the one or more second processing units is tightly coupled to a corresponding second level of the memory system. The second level of the memory may include one or more caches, one or more memories, or a combination thereof. A memory controller may be used to move data between the memory and the one or more caches.

A host processor of the one or more host processors may include an instruction scheduler operable to route instructions of the program of instructions selectively to at least one of the first and second processing units, dependent upon the availability of the processing units and the location of data to be used when executing the instructions.

The first level of the memory system may include one or more level one (L1) caches, each accessible by a host processor of the one or more host processors. The second level of the memory system may include a lowest level cache, where the memory controller is operable to move data between the lowest level cache and a memory or storage device.

A bus structure may be included in the apparatus to couple between the instruction scheduler and the first and second processing units.

The data processing apparatus may also include an instruction memory, capable of storing instructions of the program of instructions for the first and second processing units, an instruction fetch circuit operable to fetch an instructions from the instruction memory, and an instruction decode circuit operable to decode the fetched instruction. The instruction scheduler is responsive to the decoded fetch instruction.

The decode circuit is configured to determine if a fetched instruction is suitable for execution by one or more of the first and second processing units.

The data processing apparatus may also include a buffer, such as a register file, accessible by the first and second processing units, for temporary storage of results from the first and second processors.

The memory of the second level may include dynamic memory, non-volatile memory, or a combination thereof, for example.

A packet generator may be provided that produces a package comprising NUCD instructions and associated input values for issuance to one or more processing units of the first and second processing units. NUCD instruction may be executable on a first processing unit or a second processing unit. Other instructions may be executable on a first processing unit only/

The data processing apparatus may include at least one issue queue that stores NUCD instructions for issuance to one or more processing units of the first and second processing units.

Instructions of a hardware description language that describe the apparatus may be stored and distributed on a non-transient computer readable medium.

When multiple processing units are operated in parallel, a mechanism is provided to maintain data coherence. In accordance with various embodiments, a method is provided for maintaining data coherence in an NUCD. The method comprises backing up first data stored at first data locations to be operated on in the cache or memory to second data locations and blocking access to the first data locations. When the first data is stored in the cache and is in a modified state, the first data is written to the memory. If not, the state of first data is changed to the modified state. The first data locations may then be operated on by one or more of the first and second processing units to produce output data.

The first data may be backed up by allocating a scratch pad memory and writing the first data to the scratch pad memory. In some embodiments the scratch pad memory is allocated in the cache when the first data locations are operated on by the first processing unit or the second processing unit. In particular, when the first data is stored at a first level of a multi-level cache and the scratch pad memory is allocated in the multi-layer cache at a level no higher than the first level, any lines corresponding to the scratch pad memory at other cache levels may be invalidated.

The scratch pad memory may be allocated in the memory or in different memory.

When the output data are valid, the output data are stored, access to the first data locations is unblocked and access to the scratch pad memory is enabled. Also, when the output data are valid, the output data are stored and access to the first data locations is unblocked.

The output data may be determined to be invalid in response to a signal from the host processor indicating an incorrectly predicted program branch, or in response to an exception thrown by a processing unit of the first and second processing units that produced the second data. The host processor may be signaled to indicate the exception.

When the output data are determined to be invalid, the backed-up first data may be copied from the second data locations to the first data locations. If the first data locations are in the cache, data stored at the first data locations may be invalidated.

When the first data locations are in the cache, access to the first data locations may be blocked by a cache controller. For a multi-level inclusive cache, the cache controller blocks access to all levels of the multi-level cache that hold copies of first data.

In various embodiments, a data processing apparatus is provided for executing a program of instruction. The data processing apparatus includes a multi-level memory system, one or more host processors each having a first processing unit and one or more second processing units. A first level of the memory system is accessible by a host processor of the one or more host processors. The one of more second processing unit are tightly coupled to second level of the memory system that may include cache memories, non-cache memories, or a combination thereof. The apparatus also includes a memory controller, operable to move data between the non-cache memory and the one or more caches of the memory system, a reorder buffer operable to maintain data order during execution of the program of instructions, an instruction scheduler operable to route instructions of the program of instructions selectively to one or more of the first and second processing units via the reorder buffer, and control logic that blocks access to data locations of the one or more caches and the memory in use by a selected processing unit of the first and second processing units by processing units other than the selected processing unit, where access is blocked until data associated with the lines is released from the reorder buffer.

The control logic may be, for example, a cache controller that blocks access to lines of the cache in use by one of the first and second processing units until data associated with the lines is released from the reorder buffer. The cache controller may be responsive to a signal from the reorder buffer.

A scratch pad memory may be provided for storing a back-up copy of data stored at the data locations of the one or more caches and the memory in use by a processing unit of the first and second processing units.

In accordance with various further embodiments, a method is provided for maintaining data coherence in a NUCD that includes a multi-level memory system. A cache of a first level of the memory system is accessible by the host processor having a first processing unit. A second level of the memory system may include one or more caches, a memory, or a combination thereof. One or more second processing units are tightly coupled to the second memory system. The method comprises: fetching, by a fetch circuit of the first controller, a block of instructions from an instruction memory, determining a range of memory addresses to be accessed during execution of the block of instructions, issuing the range of memory addresses to the memory controller, the memory controller blocking access to the range of memory addresses, and issuing the block of instructions to an instruction queue of a processing unit of the first and second processing units. When data associated with one or more memory addresses in the range of memory addresses is stored in the cache, the data stored in the cache is evicted to the memory when the data is in a modified state and a state of data stored in the cache is set to exclusive. The block of instructions is executed and the memory controller releases access to the range of memory addresses after results of the block of instructions are committed to memory.

The range of memory addresses to be accessed during execution of the block of instructions may be dependent upon one or more register values. In which case, determining the range of memory addresses to be accessed during execution of the block of instructions comprises determining if the one or more register values are ready.

Data order may be maintained through the use of a reorder buffer that stores, in sequence, entries for a single instructions and entries for instruction blocks. An entry for a block of instructions can include a start address of the block of instructions, an end address of the block of instructions, an indicator of registers of the plurality of registers that provide input values to the block of instructions and an indicator of registers of the plurality of registers for holding output values resulting from execution of the block of instructions. Instructions are not released to a processing unit until all inputs, as indicated by the reorder buffer, are ready. The end address of the block of instructions may be an address or an offset from the start address of the block of instructions, for example.

The reorder buffer may be configured as two reorder buffers. A first reorder buffer stores entries for single instructions, and a second reorder buffer stores entries for instruction blocks. The first reorder buffer also stores pointers to entries in the second reorder buffer so that data order can be maintained even when instructions are executed out of order.

The scheduler writes an entry for a single instruction as a first entry of the first reorder buffer when an instruction is routed to the first processor, and writes an entry for a block of instructions to the second reorder buffer when the block of instructions is routed to the processing unit associated with the second reorder buffer. In addition the scheduler writes a pointer to the entry in the second reorder buffer as a second entry of the first reorder buffer when a block of instructions is routed to the processing unit associated with the second reorder buffer.

A rename unit is used to replace one or more register names in an instruction, of the program of instructions, with one or more register locations prior to writing a corresponding entry to the first reorder buffer or an entry to both the first and second reorder buffers.

The indicator of registers that provide input values to the block of instructions may comprise a first bit map, and the indicator of registers for holding output values resulting from execution of the block of instructions may comprise a second bit map.

Instructions are released to an instruction queue when all of the inputs, as indicated by the first and second reorder buffers, are ready.

The data processing apparatus may be described by instructions of a hardware description language stored on a non-transient computer readable medium. The instructions may be used to configure corresponding hardware during manufacture or may be used with reconfigurable hardware, such as a field programmable gate array (FPGA).

In accordance with various embodiments, a method is provided for maintaining order in non-uniform compute device (NUCD) comprising a multi-level memory system, a host processor having a first processing unit, and one or more second processing unit. The host processor is coupled to cache at a first level of the memory system, while the one or more second processing units are tightly coupled to the memory system at a second level. The second level of the memory system may include one or more caches, memory, or a combination thereof. Order is maintained by selecting a processing unit of the first and second processing units for executing an instruction block comprising one or more instructions of a program of instructions, writing an entry for a single instruction to a reorder buffer when the instruction block comprises an instruction selected for execution by the first processing unit, and writing an entry for the instruction block to the reorder buffer, when the instruction block is selected for execution by a processing unit of the second processing units. As described above, the entry for an instruction block can include a start address of the instruction block, an end address of the instruction block, an indicator of registers of the host processing that provide input values to the instruction block, and an indicator of registers of the host processor designated for holding output values resulting from execution of the instruction block.

The reorder buffer may include a first reorder buffer and a second reorder buffer, in which case data order is maintained by writing an entry for a single instruction to the reorder buffer comprises writing an entry to the first reorder buffer. Whereas writing an entry for the instruction block to the reorder buffer comprises writing an entry to the second reorder buffer and writing, as an entry to the first reorder buffer, a pointer the entry in the second reorder buffer. In addition, the value of an indicator bit may be set in the reorder buffer to indicate whether a corresponding entry comprises an entry for a single instruction or an entry for a block of instructions.

Output values may be committed only when all of the output values from a block of instruction are ready. The entries in the reorder buffer that correspond to the instruction block may then be removed. The output values are not committed if an exception is thrown or an instruction branch is incorrectly predicted.

The start address of the instruction block may be determined from an 'NUCD start' instruction of the program of instructions and the end address of the instruction block may be determined from an 'NUCD end' or 'segment end' instruction. The indicator of registers of the host processing that provide input values to the instruction block and the indicator of registers of the host processor designated for holding output values resulting from execution of the instruction block may be determined from one or more marker instructions in the program of instructions.

The disclosure is described in more detail below, with reference to the figures.

FIG. 1 is a block diagram of a data processing system 100, in accordance with various representative embodiments. FIG. 1 shows a System-on-a-Chip (SoC) 102 and a plurality of memories 104 that provide memory arrays for storing data and instructions. In the example shown, the memories 104 are coupled to the SoC 102 via bus 106. The memories may be non-cache dynamic memory, such as Dynamic Random Access Memory (DRAM), nonvolatile memory, or other type of memory. Examples of nonvolatile memory include a solid-state drive (SSD) that stores persistent data on solid-state flash memory, a storage class memory (SCM), and a hard-disk drive (HDD). The memory may be accessed via a Hybrid Memory Cube (HMC) interface, a High Bandwidth Memory (HBM) interface, or other interface.

The SoC 102 includes one or more host processors 108 that are each coupled to a level one (L1) cache 110. The L1 caches 110 may contain both data and instructions for the host processors 108. In this example, the L1 caches are served by a shared level two (L2) or second level cache 112. A memory control 114 couples the shared L2 cache to the memories 104 and allows data and instructions to be loaded from and stored to the memory arrays of the memories. The memory controller 114 is operable to move data between the memories and the one or more caches. The caches may be inclusive or exclusive.

Other embodiments may utilize different cache and processor architectures, with fewer or more cache levels.

Together, the caches 110, 112 and memories 104 form a multi-level memory systems. Additional devices and cache levels may be included without departing from the present disclosure. In the embodiment shown, a first level of the multi-level memory system includes L1 caches 110, while a second level includes the L2 cache 112 and memories 104. In some embodiments, the first and second levels of the memory system may overlap, so that one or more L1 cache is both in the first level and the second level, for example.

The host processors 108 include first processing units that comprise circuits for performing logic and arithmetic operations on data.

In accordance with a first aspect of the present disclosure, some or all of the caches 110 and 112, and some or all of the memories include second processing units. These processing units have high speed connections to their associated memories in the second level of the multi-level memory system, and are designed to operate on data stored in these memories. The capabilities of the second processing units may be different from the capabilities of the first processing units, so the second processing units and their associated memories are referenced to as NUCD modules, since processing is not uniformly distributed in the data processing system. A communication pathway 116 is provided between the host processors 108, the one or more caches 110 and 112 and the memory controller 114. In the embodiment shown in FIG. 1, the communication path comprises a high speed bus such as described in the Advanced Microcontroller Bus Architecture (AMBA™) specification of ARM Ltd., for example.

In accordance with a further aspect of the disclosure, instructions suitable for execution on an NUCD module are provided together with standard instructions to be executed on a host processor. NUCD instructions could be compatible with the host processor instruction set architecture (ISA) or separate instructions designed for specific NUCD modules. In one embodiment, specific instructions provide markers, within a program of instructions, to identify blocks of instructions that can be executed on an NUCD module and what functional resources are required for execution of the block of instructions. A scheduler circuit is provided to determine, during operation, which NUCD module should be used to execute the block of instructions. In contrast to previous disclosures, the block of NUCD instruction may be executed on a host processor when no NUCD module is available.

Since instructions executed in parallel by different processing elements, processing may be executed out of order, a mechanism is provided to ensure that results are used in the correct order.

Concurrent execution of NUCD-blocks simplifies the addition of out-of-order processing to otherwise in-order or sequential processors and allows processing devices to be located close to where the data is stored. NUCD computation could be initiated by a scheduler of a local host processor, or by a non-local host. Initiation may be achieved via a common bus, or other communications means. The NUCD approach reduces the energy, and latency associated with data movement—potentially reducing the energy needed for computation while increasing performance.

A mechanism is also provided for handling exceptions at a block level both for NUCD modules located on the SoC itself (near cache) and off-chip (near memory such DRAM memory or the like).

Mechanisms are also provided for signaling and providing instructions to a NUCD, for enabling parallel execution of instructions, for maintaining data coherence, and for synchronizing between NUCD executions/write-backs.

It will be apparent to those of ordinary skill in the art that other processing units, such as graphics processing unit (GPU), digital signal processor (DSP), field programmable gate array (FPGA) or an application specific integrated circuit (ASIC) device may be included in system 100. Note that many common elements of a SoC, such as timers, address generators, and load/store devices, for example, have been omitted in FIG. 1, and other figures herein, for the sake of clarity.

Figure 2:
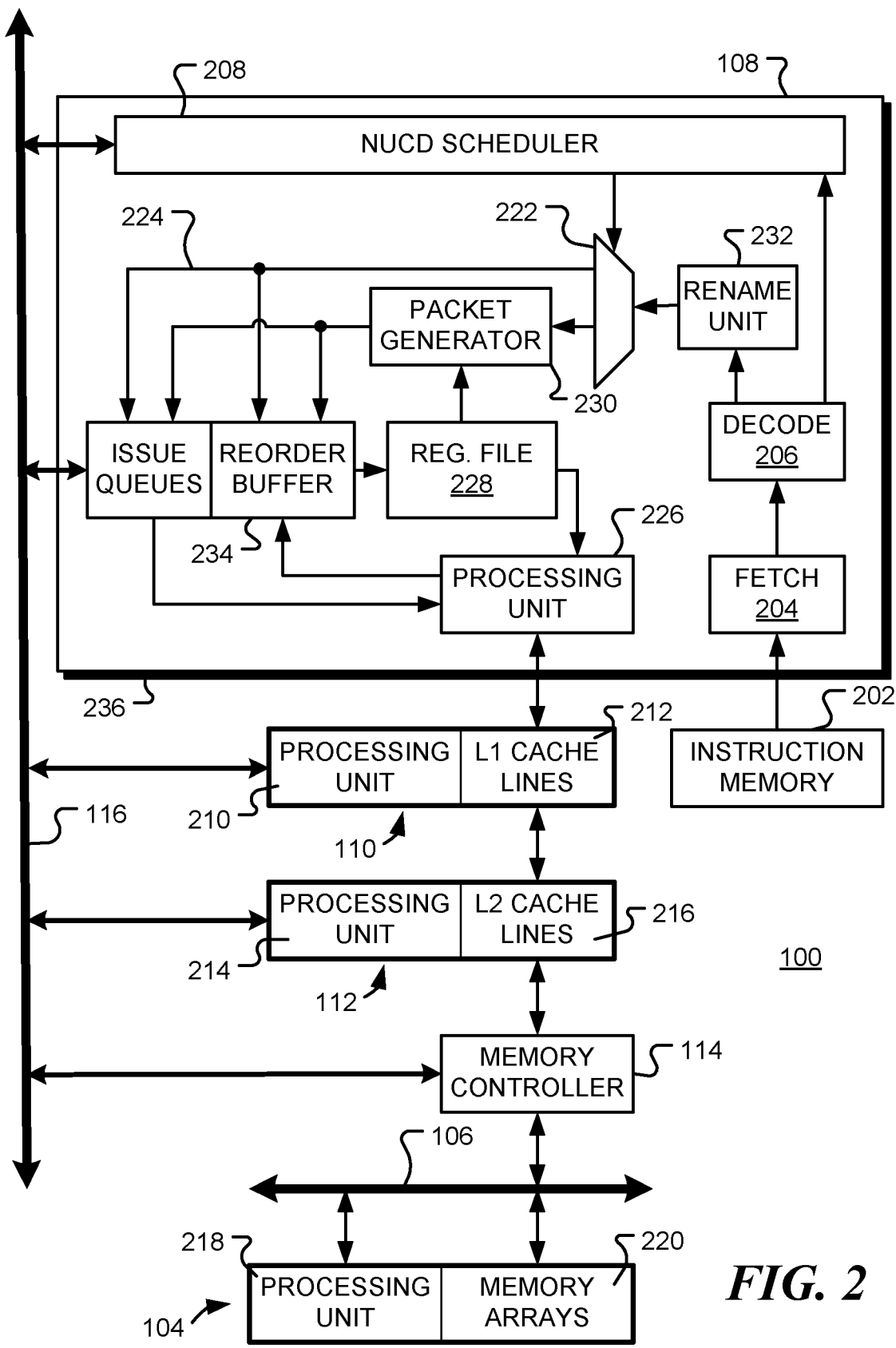
FIG. 2 is a further block diagram of a data processing system, in accordance with various representative embodiments.

FIG. 2 is a further block diagram of a data processing system 100, in accordance with various representative embodiments. FIG. 2 shows a more detailed diagram of an example of a system showing a host single processor 108, a single L1 cache 110 and a single memory 112. Again, some elements have been omitted in FIG. 2 for the sake of clarity.

Referring to FIG. 2, instructions stored in instruction memory 202, or other instruction store, are retrieved sequentially by fetch circuit 204 of the host processor 108. The fetch circuit 204, for example, may bring the instruction into an instruction register, a circuit that holds the instruction so that it can be decoded. The instruction memory 202 may be part of the L1 cache or a separate instruction cache, for example. Each instruction is decoded by decode circuit 206 and passed to NUCD scheduler 208. The decode circuit 206 determines which opcode/function is encoded in the instruction and determines which memory addresses contain the operands.

If a block of decoded instruction can be executed on a NUCD module (e.g. 110, 112, 104), the scheduler 208 communicates with the NUCD modules via communication pathway 116 to determine their ability to execute the instructions. In the example shown, communication the memory 104 is enabled via memory controller 114, which addresses memory mapped registers in the memory 104 via bus 106. Also, in this example, cache NUCD module 110 comprises a second processing unit 210 associated with L1 cache lines 212, cache NUCD module 112 comprises a further second processing unit 214 associated with L2 cache lines 216 and memory NUCD module 104 comprises a still further second processing unit 218 associated with memory arrays 220. In particular, the scheduler may determine (a) whether the processing units are busy and (b) whether the required data is likely present in an associated cache.

The NUCD scheduler 208, is placed after the decode circuit 206 and dynamically decides where to execute the potential NUCD instructions. The potential NUCD instruction block appears as a sequence of marked normal instructions, as described below with reference to FIG. 8. The NUCD scheduler 208 can, for example, take the form of a simple workload based scheduler that monitors queue occupancy, or uses a machine learning or statistic driven approach such as reinforcement learning. However, any mechanism that can produce a decision to schedule NUCD blocks may be used.

The NUCD scheduler 208 decides, based on selected criteria, to either issue the NUCD-block to a cache NUCD module (210, 214, for example) or off-chip NUCD module (218, for example), or to issue the block as a "normal" instruction block to be executed by the processing unit 226 of the host processor.

Rename unit 232 replaces the architectural registers names in the decoded instructions with physical register locations in register file 228. Output register locations may be used in order to preserve data order when instructions are executed out of order. For NUCD instruction blocks, only the input and output register names—identified in the NUCD marker, for example—are renamed.

When no NUCD module is available—for example, when all are busy—the block of NUCD instructions, with renamed registers, may be routed using switch 222 and pathway 224 to the processing unit 226 of the host processor 108 for execution. For example, load and store operations executed by processing unit 226 may move data between the L1 cache lines 212 and register file 228 or may perform arithmetic and logic operations on data stored in register file 228.

Instructions are placed in one of the issue queues 236 for dispatch to the processor 226 when the operands become available. In one embodiment, one issue queue is used for the processor 226, another for on-chip NUCD modules (210 and 214 for example), and yet another for off-chip NUCD modules (218 for example). Results of operations may be stored directly back to register file 228 or to reorder buffer 234.

When an NUCD is available, switch 222 routes the block of NUCD instructions to packet generator 230 for routing to one or more NUCD's. Packet generator 230 packages the required inputs from register file 228 with the NUCD instructions. When issuing NUCD instructions to a processing unit of a cache, there are two modes of operation. The first mode of operation is to issue a packet that contains the instructions to be executed to the processing unit. The second mode of operation is to utilize the instructions present within the cache and only send a pointer to these instructions (such as a program counter value and length value). If the implementation were to utilize the instructions already present in the cache, the scheduler must know if this is in fact the case prior to issuing the instructions to the NUCD module. Otherwise, the instructions are issued from the scheduler as a packet.

The decoded instructions may use registers in register file 228 for storing intermediate results that are operands for future operations. The sequential order of the results is maintained using reorder buffer 234. The corresponding operations are stored in one or more issue queues 236. In one embodiment, when a renamed operand becomes known (being returned from an NUCD processing unit or a host processing unit), the corresponding register is updated in the register file and the corresponding operands in the instruction queue are updated. In operation, only those instructions whose operands are known are issued to an NUCD module. Results from operations issued to NUCD modules may be returned via pathway 116.

The reorder buffer 234 is discussed in more detail below with reference to FIG. 9. The buffer records the sequence in which results are used so that, for example, values are written the register file or memory in the desired order. This enables out-of-order and parallel computation of results and also enables speculative execution and exemption handling.

The NUCD architecture described above seamlessly integrates NUCD instruction execution into a conventional system. The processing units (such as 210, 214 and 218) in memory are considered remote functional units of the host or host processor and may potentially be shared with other processors (in the case of L2/L3 and off-chip NUC devices). The NUCD instruction scheduler 208 dynamically decides where to execute the potential instructions (based on markers which are described below). If NUCD execution is bypassed then the block is simply issued as a regular local instruction stream with the markers stripped, otherwise the block is packaged by packet generator 230 and placed in either a partition of the reorder buffer 234 or a specialized NUCD-queue structure (for ordering, speculation handling).

In the disclosed architecture, the NUCD instructions share the host data path hardware resources for instructions. This takes advantage of a conventional host design to support speculative execution, and supports block-level exceptions. Speculative execution of NUCD-blocks (as discussed below) increases the effective instruction level parallelism (ILP), and memory level parallelism (MLP) of the system.

The standard reorder buffer, and load/store process (such as inserting markers for the memory locations accessed by the NUCD module into the load/store queue) takes care of synchronization just as if another processor held the needed cache lines.

A separate structure may be incorporated to handle additional data needed by the NUCD block, not found within a standard reorder buffer. In one embodiment, the reorder buffer is modified to accommodate the additional information. In another embodiment, a separate NUCD/partitioned reorder buffer is included to augment the standard reorder buffer. This is discussed in more detail below with reference to FIG. 9.

If data that the NUCD module is operating on are needed by a subsequent instruction, beyond the NUCD block, then an entry is allocated for the NUCD block in the reorder buffer 234. The processor must order around this load as it would any other stalled load. For the case where one or more NUCD-block outputs are needed directly by subsequent instructions outside of the NUCD-block, a partition of the reorder buffer or separate NUCD-queue maintains the values returned from the NUCD-block until the instructions that need them have been issued (assuming these return values are not memory backed for some implementation), and the write-back/release status of the NUCD-block is updated, again with the purpose of maintaining sequential consistency.

Code within the NUCD-block may either be bounded in memory access, or not, depending on the implementation. For a bounded NUCD region, the loops contained within it are either statically unrolled, or dynamically unrolled (i.e., loop bound fully resolved before dispatch of the NUCD-block). The bounds may be required for blocks issued to cache NUCD modules as the goal is to move the computation closer to the data, rather than to create more consumers of memory for the memory system to maintain. Knowing the data locations ahead of time allows placing the NUCD block's execution to those caches where the data actually resides, without evaluating the block to find out the addresses. For an off-chip NUCD processing unit, such as processing unit 218, there are several options. Firstly, an input/output memory management unit (IOMMU) may be used to find the physical addresses of non-contiguous memory resident pages. Secondly, the physical addresses can be pre-calculated from the virtual ones on the host processing unit (CPU), temporarily page locked, and then operated on them. Thirdly, off-chip NUCDs may be limited to single page operation (which will be resolved on the host CPU). Lastly, some systems may need no address translation at all.

Figure 3:
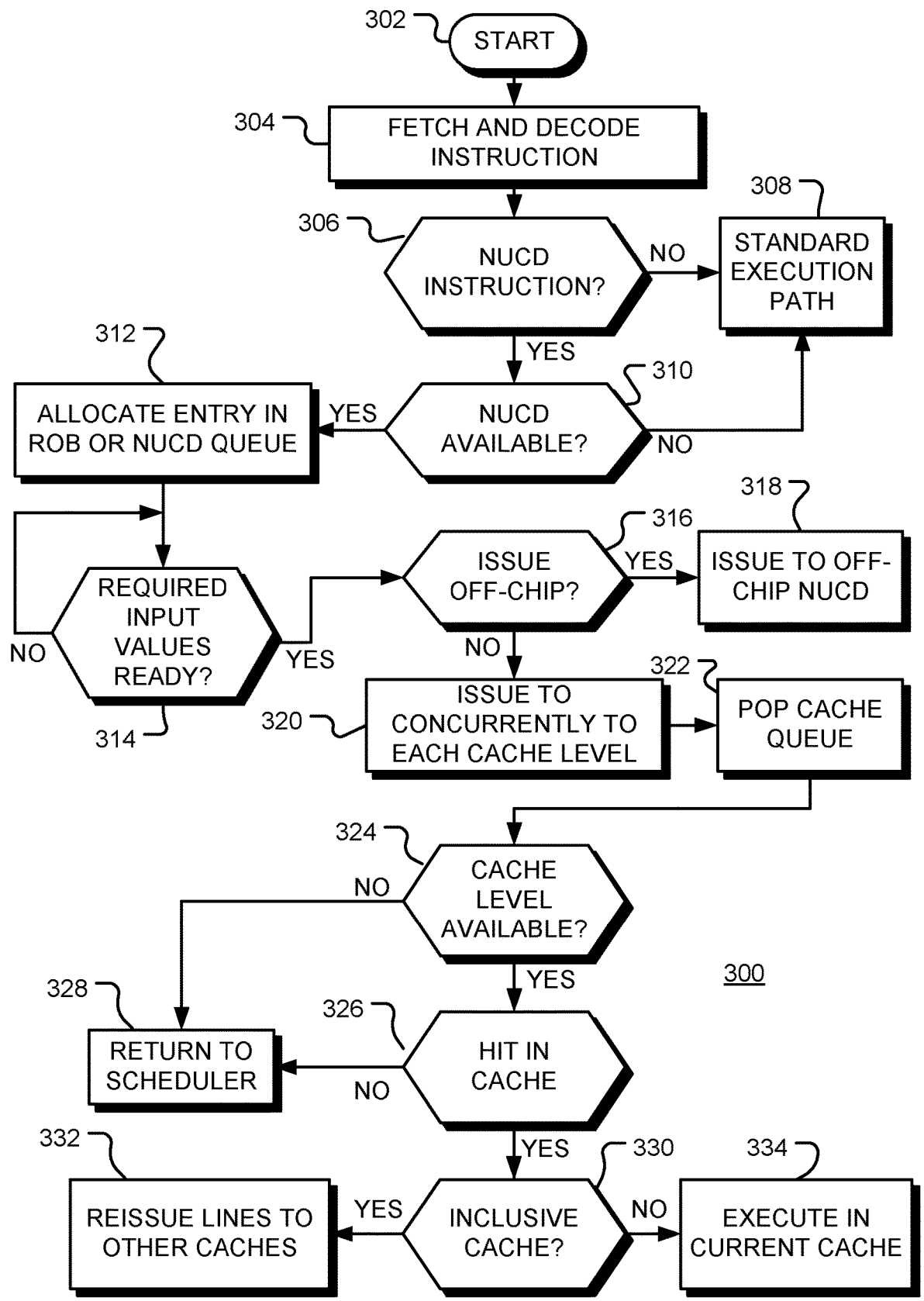
FIG. 3 is a flow chart of a method of issuing instructions in a data processing system, in accordance with various representative embodiments.

FIG. 3 is a flow chart 300 of a method of operation of a data processing system, in accordance with various representative embodiments. In particular, FIG. 3 relates to a method of issuing instructions in a data processing system. Following start block 302, an instruction is fetched from an instruction memory and decoded at block 304. At decision block 306 it is determined if this an NUCD instruction. In one embodiment, blocks of NUCD instructions are included with host processor instructions and are indicated by NUCD markers. NUCD markers are discussed in more detail below.

If the instruction is not part of an NUCD instruction block, as depicted by the negative branch from decision block 306, the instruction is executed at block 308 in standard pathway by a processing unit of a host processor. If the instruction indicates the start of an NUCD block, as depicted by the positive branch from decision block 308, flow continues to decision block 310. The scheduler then determines if an appropriate NUCD module is available. For example, the NUCD modules may be queried to determine if they are busy or not. If no NUCD module is available, as depicted by the negative branch from decision block 310, the instruction is executed at block 308 in the standard pathway by a processing unit of a host processor. Otherwise, flow continues to block 312, where an entry is allocated into a reorder buffer and/or NUCD queue. As depicted by the negative branch from decision block 314, the block of instructions remains in the queue until all of the required input values are ready. When the input values are ready, a determination is made at block 316 whether the block of NUCD instructions should be directed (at block 318) to a processing unit associated with off-chip memory or (at block 320) to a processing unit of an on-chip cache. The decision may depend on the availability of the processing units and whether required data in stored in a cache line, for example. When issued to a processing unit of an on-chip cache, the block of instructions may be issued concurrently to each cache level at block 320 and placed in a cache instruction queue. At bock 322, an instruction is popped from the cache instruction queue, if the processing unit at the cache level is available, as depicted by the positive branch from decision block 324, a check made at decision block 326 to determine if the required data is in the cache (referred to as a 'cache hit'). If not, or if the processing unit is unavailable, the instruction may be returned to the scheduler at block 328. If the processing unit is available and there is a hit in the cache, as depicted by the positive branch from decision block 326, flow continues to decision block 330. When the cache is an inclusive cache, lines not available to the current cache level N are reissued to the next level cache, level N+1, if one exists, at block 332. Otherwise, when the cache is an exclusive cache, as depicted by the negative branch from decision block 330, the instruction is executed in the current cache at block 334.

In this approach, instead of using extensions to an instruction set architecture (ISA), a standard ISA is used in which segments of the binary instruction stream that are suitable for execution on a NUCD module are tagged either by the user (manually), the compiler (statically), or by the hardware (dynamically). In a further embodiment, specific architectural extensions are used to designate pre-defined NUCD operations. For example, a custom instruction for matrix multiply or dot product may be provided.

For example, in an embodiment where NUCD code is designated by markers or tags, an NUCD "start segment" instruction encodes the length of the code block (termed NUCD block from this point forward) and encodes the necessary capabilities (i.e., floating point, integer only, etc.). Standard ISA commands within the code segment will execute as received when issued to host (local) functional units. The NUCD instruction block is accompanied by a NUCD Marker or header, as discussed in more detail below with reference to FIG. 8. When no NUCD module is available, the markers are stripped by the scheduler so as to enable normal execution of the block. When scheduled on an NUCD module, the code will be executed on the NUCD module.

An NUCD block without any store operations can be speculatively executed and the one or more results will be returned to the host processor as soon as it is available. A NUCD instruction with store operations can also speculatively load operands and roll back any operations without touching working memory, as will be described below. Sequential consistency is maintained by the reorder buffer or specialized NUCD-queue, since memory is only committed when released from the reorder buffer. For operations issued to caches, a result is released by relinquishing the cache line to the processor or by writing point values back directly to the reorder buffer. For operations issued to an off-chip NUCD module, results may be stored in a scratch pad that is flushed to memory once the NUCD-block is committed from the reorder buffer (ROB). This is similar to a normal store instruction pathway. In this way, the system can be safely recovered from branch prediction errors or exceptions. When a branch is incorrectly predicted, the reorder buffer can signal the NUCD module to squash instructions on the wrong path before the data modified in the block is erroneously stored to main memory. As part of the scheduling process, the range of data being operated may be determined. When the caches themselves are being used directly as a scratch pad, they cannot by design exceed their scratchpad space. Off-chip NUCD module scratch pads could be exceeded. However, by knowing the range of data being operated on a priori, over-running the scratch pad can be avoided by not issuing NUCD-blocks that would do so. This limitation can be overcome with off-chip memory devices that contain a memory management unit or are otherwise able to allocate memory to extend the scratch pad dynamically.

Exceptions within any NUCD module can be handled succinctly at the NUCD block level, potentially with pointers back to the precise instruction that originated the exception.

Figure 4:
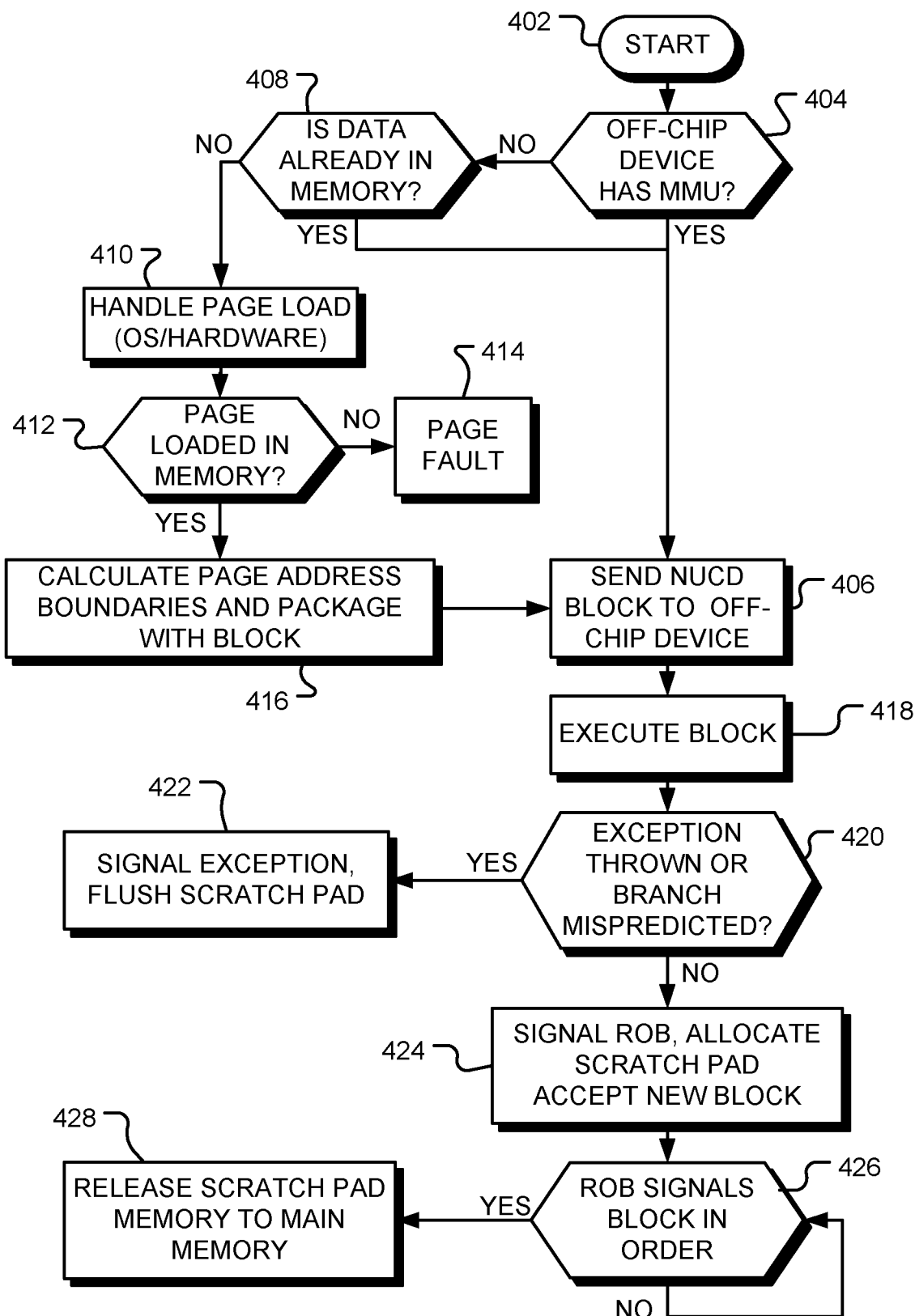
FIG. 4 is a flow chart of a method of issuing instructions in a data processing system, in accordance with various representative embodiments.

FIG. 4 is a flow chart 400 of a method of instruction issue and exception handling in an off-chip NUCD module of a data processing system, in accordance with various representative embodiments. It also includes the re-order and scratch pad logic. As part of the off-chip issue pathway, if any of the memory is resident in cache, then the lines are invalidated before the NUCD operation starts. Following start block 402, if the off-chip NUCD module has a memory management unit (MMU), as depicted by the positive branch from decision block 404, the block of instructions is sent to the off-chip NUCD module at block 406. The block of instructions is sent to the off-chip NUCD module at block 406 if the off-chip NUCD module doesn't have a memory management unit (MMU), but the required data is already in memory, as depicted by the positive branch from decision block 408. If the data is not in memory, the required page load is attempted at block 410 by the operating system or hardware. If the page is not loaded correctly, as depicted by the negative branch from decision block 412, a page fault is signaled at block 414. Otherwise, page address boundaries are calculated and packaged with the instruction block at block 416. The complete packet is then sent to the off-chip NUCD module at block 406. The block of instructions is executed at block 418. If an exception is thrown, as indicated by the positive branch from decision block 420, the exception is signaled to the host processor at block 422 and the scratch pad memory is flushed. If no exception is thrown, as depicted by the negative branch from decision block 420, the NUCD module signals, at block 424, to the reorder buffer (ROB) that the operation is complete. Also at block 424, if memory is available, the NUCD module allocates a new scratch pad is ready to accept a new block of instructions. At decision block 426, the NUCD module waits until the reorder buffer signals that the NUCD block is in the proper order. Then, as depicted by the positive branch from decision block 426, the contents of the scratchpad are released to the main memory at block 428. Processing of the NUCD block is then complete.

Figure 5:
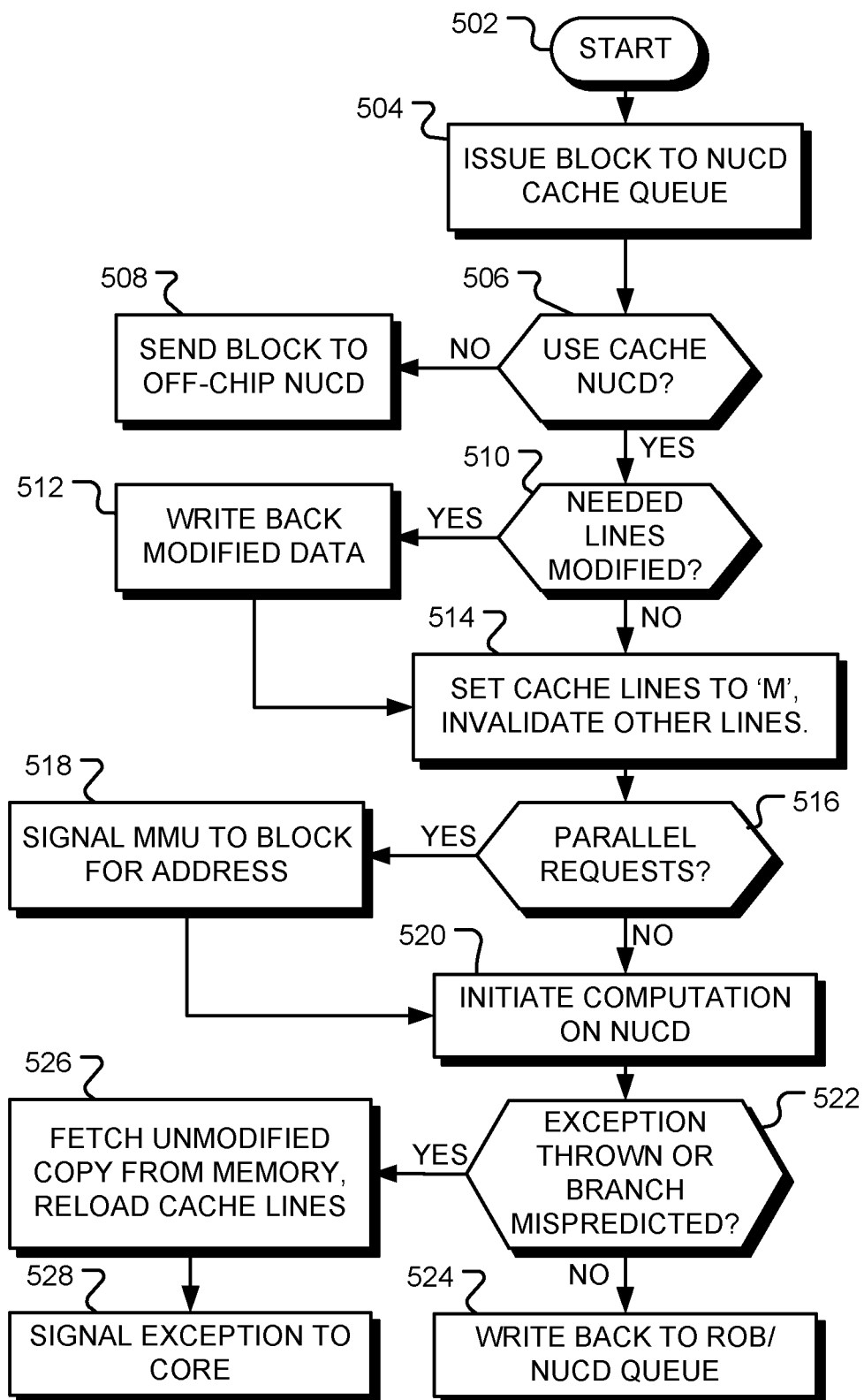
FIG. 5 is a flow chart of a method of exception handling in a data processing system, in accordance with various representative embodiments.

FIG. 5 is a flow chart 500 of a method of instruction issue and exception handling in a cache NUCD module of a data processing system, in accordance with various representative embodiments. A cache NUCD module has the advantage of being able to use the cache itself as a scratch pad, whereas off-chip NUCD module must have a data segment or special memory set aside for a scratch pad in case of exception or invalid speculative branch.

Following start block 502 in FIG. 5, an NUCD-block is issued to a cache NUCD module at block 504. If the cache NUCD module is unavailable, or if the required data is not present in the cache, as depicted by the negative branch from decision block 506, the instruction block is sent to an off-chip NUCD module at block 508 or returned to the scheduler. Otherwise, the block is issued to cache NUCD module as depicted by the positive branch from decision block 506. The first action is to ensure that all cache lines operated on exist in a backed-up state (either in memory or a higher level of the cache, i.e., if L2 is being operated on the values may be written through to L3 without an expensive write to memory). Once this "back-up" copy is created, access to these lines is blocked. If the needed data in the cache lines are currently in a modified state, as depicted by the positive branch from decision block 510, they are written back to memory at block 512. The cache lines to be operated on are set to the 'modified' state at block 514 so as to invalidate copies of the data that may be held in other caches. This may be done using the cache controller, in the same manner as if the processor were writing a new value. If the NUCD block has been issued in parallel to other on-chip or off-chip NUCD modules, as depicted by the positive branch from decision block 516, a signal is sent at block 518 to the corresponding MMU to block attempts to access memory at the corresponding addresses. The data in the cache lines may then be operated on and computation is initiated at block 520. Once operation is complete, a check is made to determine if an exception has been thrown (or a branch incorrectly predicted) at decision block 522. If no exception is thrown, as depicted by the negative branch from decision block 522, the results are return to the reorder buffer or NUCD-queue at block 524. The backup copy of the cache lines (i.e., the other copies in the cache, not the NUCD-operated one) may be overwritten with the new values. If an exception is thrown, as depicted by the positive branch from decision block 522, the NUCD-modified lines are invalidated, and in addition, two things could happen depending on where the back-up copies exist: either the NUCD-operated line could be reloaded from other clean lines within a different level of the cache, or if a clean copy doesn't exist in the cache, the memory controller is queried to retrieve the current values, as depicted by block 526. Once the cache line has been restored, the exception is signaled, at block 528, to the host that originated the NUCD-block. Another option is to invalidate the line and let the backup copy be brought back into the cache by a demand miss, if inclusion/exclusion properties allow this timing. This has the effect of creating a memory transaction, which is check-pointed in-memory, and rolled back if an error occurs (invalidated).

As indicated by decision block 522, speculative execution (such as branch prediction) is handled in a similar manner as an exception. When an invalid branch has been taken, the current state of the NUCD operation is invalidated and the clean, pre-execution, state is restored.

When the NUCD-block is sent to an off-chip memory device, as depicted by block 508, a scratch pad may be created so that the results of an NUCD-block that throws an exception are not committed to memory. The exception path is still at the block level, and the exception returns to the host from which the block originated. Despite being at the block level, an offset to the start of the NUCD-block may be returned to indicate a precise exception point. As mentioned above, the exception path is dependent on communication with the main host. Incorrect branch prediction is dependent on signaling from the reorder buffer. For off-chip NUCD modules, the depth of the scratch pad, needed to enable instructions to be rolled back before committing to working memory, is also dependent upon signaling from the reorder buffer.

Figure 6:
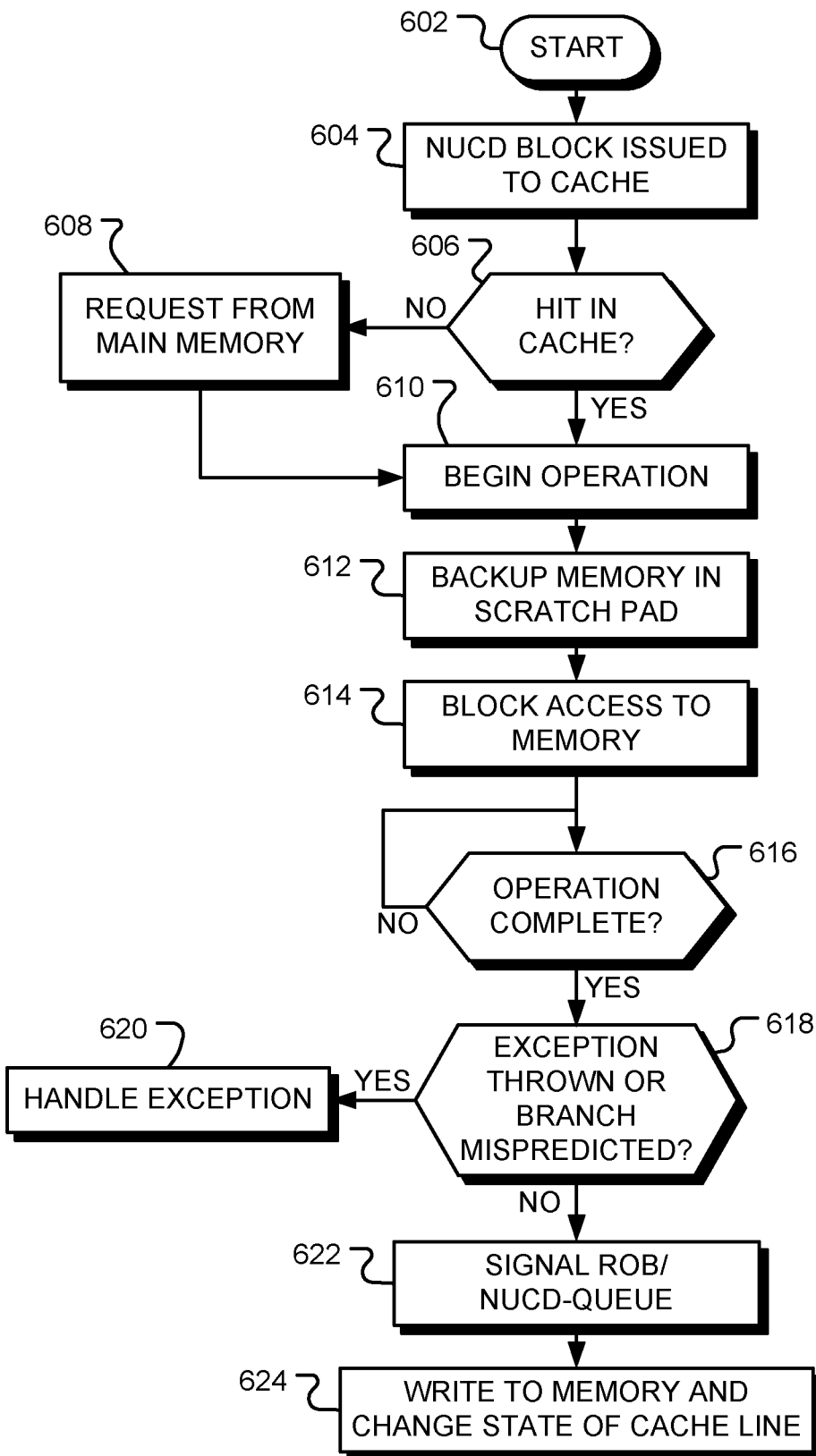
FIG. 6 is a flow chart of a method of speculative instruction execution in a data processing system, in accordance with various representative embodiments.

FIG. 6 is a flow chart 600 of a method of maintaining cache and memory coherence in a data processing system, in accordance with various representative embodiments. The method is applicable to both on-chip (cache) and off-chip (memory) NUCD modules. Following start block 602, a block of NUCD instructions is issued to a cache NUCD module at block 604. If the required data is not present in a cache line, as depicted by the negative branch from decision block 606, the data is requested from the main memory at block 608 and operation begins at block 610. An alternate action to fetching the needed lines from maim memory is to simply issue the NUCD-block to an NUCD module of the memory or return the block back to the main host for processing. The data are backed-up in a scratch pad at block 612 and, after ensuring a back-up copy is available, the cache controller blocks the lines being operated on at block 614 (within all levels of cache if the cache is inclusive). This blocking may be achieved just as if the processor itself were performing a write to that location. In a cache NUCD module, the cache itself may be used to provide the scratch pad memory. When another processor attempts to access the memory, it appears to be in the modified state, and the cache controller stalls access until the NUCD operation is complete.

Once operation is complete, as depicted by the positive branch from decision block 616, a check is made at decision block 618 to determine if an exception has been thrown (or a branch incorrectly predicted). If no exception is thrown, as depicted by the negative branch from decision block 618, the reorder buffer or NUCD-queue is signaled at block 620. The backup copy lines (i.e., the other copies in the cache, not the NUCD-operated one) may be overwritten with the new values. The state of the cache lines that were operated on is changed at block 622 to unlock the lines and values may be written to memory. If an exception is thrown, as depicted by the positive branch from decision block 618, the exception is handled at block 624.

In this way, the coherence of NUCD memory accesses is largely maintained by the current cache coherence mechanisms. The only addition is the control logic necessary to block lines currently in use by an NUCD module, but not yet released by the ROB/NUCD-queue. An attempt to access memory being used by a NUCD-block is a simple read-after-write (RAW) dependency. One solution is to issue the request to the cache, as if it were ready (simplifying the layout of the reorder buffer structure, and reducing traffic between the NUCD module and the processor itself), and block at the cache containing the values until the line is released by the NUCD module (with a signal by from the processor). To resolve dependencies from the non-local processor, the process is similar. The line being used by the NUCD module is in the 'modified' (M) state. The memory access is blocked by the cache controller until computation by the NUCD module is complete, and the reorder buffer has signaled the release of the memory so as to maintain sequential consistency for the results. On release, the other local cache levels holding the same line are updated with the new values, and from there the standard cache state machine applies in transition from the M state.

In order for exceptions and speculative execution to be possible, each NUCD execution should be reversible. In an off-chip NUCD module (not shown) the scratchpad is simply a reserved segment of the physical memory. To accomplish this with as much re-use of existing hardware as possible, the cache lines themselves may be used as scratch pad memory for cache NUCD modules, as described in FIG. 7.

Figure 7:
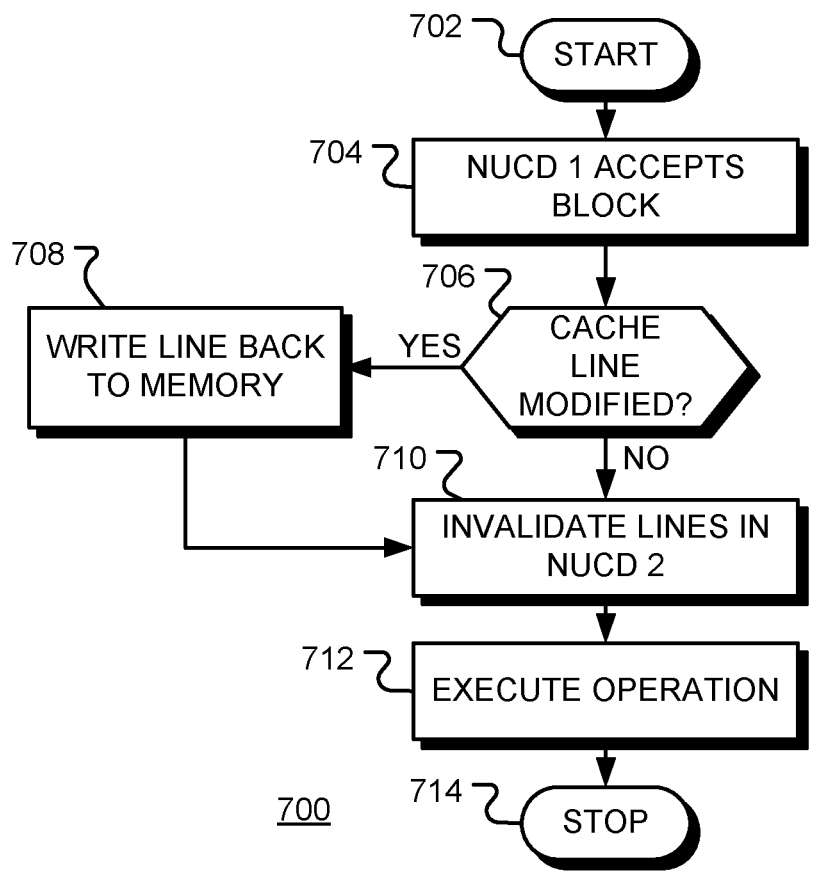
FIG. 7 is a flow chart of a method for maintaining data coherency in a data processing system, in accordance with various representative embodiments.

FIG. 7 is a flow chart 700 of a method for using cache lines themselves as a scratch pad memory, in accordance with various representative embodiments. In the embodiment shown there are always exactly two valid lines: the one being operated on by the NUCD module, and the other resident in memory. This is accomplished by locking the line used by the NUCD modules in all other local caches, and invalidating the line in non-local caches. In an off-chip NUCD module (not shown) the scratchpad is simply a reserved segment of the physical memory. Following start block 702, a first NUCD module (NUCD 1) accepts an instruction block at block 704. If the line, or lines, intended for the operation is in the modified state, as depicted by the positive branch from decision block 706, it is written back to memory at block 708 before the operation commences. If the line is not in modified state, as depicted by the negative branch from decision block 706, a clean copy already exists in memory and also in higher levels of cache when an inclusive cache model is used. The corresponding cache lines are then locked in other NUCD cache modules (such as NUCD 2 for example) at block 710 and the operation is executed at block 712. The method terminates at block 714. Thus, once a transaction on a line begins, a clean copy still exists in higher levels of the cache or memory.

The off-chip (in-memory) NUCD module also utilizes a scratchpad to temporarily hold the NUCD module's store operations (a "redo log"). This could take the form of portioning the global physical address space into a dynamically allocated scratchpad (assuming an IOMMU) or a statically partitioned one. This could also take the more limited form of a set of other fast memory distinct from the global memory.

Figure 8:
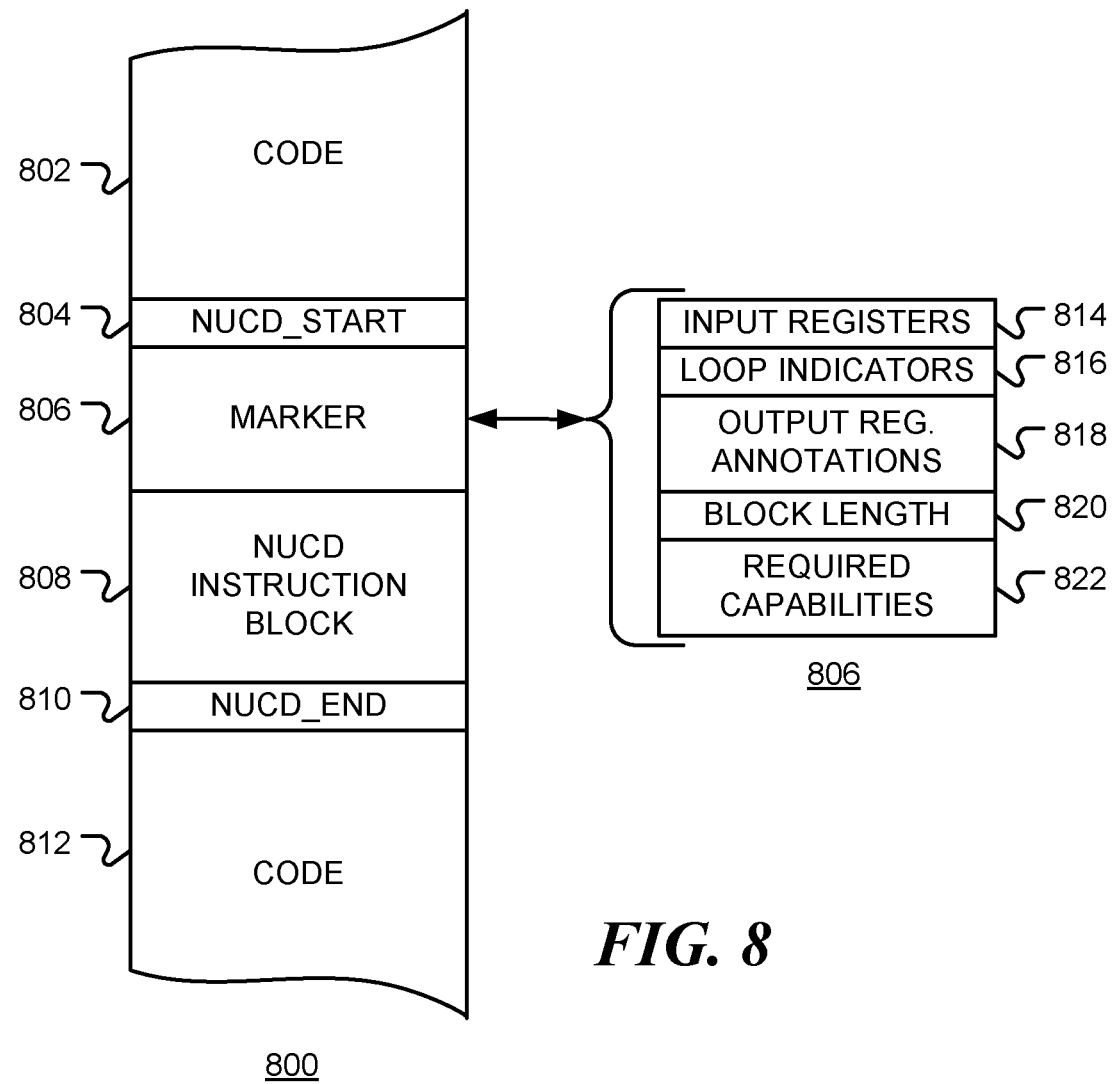
FIG. 8 is a diagrammatic representation of a code block, in accordance with various representative embodiments.

FIG. 8 is a diagrammatic representation of a code block 800, in accordance with various representative embodiments. The code block 800 includes standard code 802, followed by an NUCD_START instruction 804 that designates the start of a section of code that may be executed on an NUCD module. The NUCD_START instruction 804 is followed by an NUCD marker or header 806, the actual NUCD instructions 808 and, optionally, an NUCD_END statement 810. The NUCD_END statement may be omitted, for example, when the marker 806 specifies the number of instructions in the block 808. Additional standard code 812 follows the NUCD block.

The NUCD_START and NUCD_END instructions mark the code block, indicating the beginning and end respectively. The marked segments are assumed to be compatible with the NUCD module's conditions for execution. The components of the NUCD-block are enumerated above. The end instruction may be omitted when the length of the block is indicated.

The NUCD marker 806 may include, for example:

Compiled input registers 814. Registers 814 provide input values to the NUCD-block. These may be renamed, after being decoded, to match any moves from other registers dynamically or statically. When the register values are available they are packaged into the NUCD execution packet for dispatch.

Loop indicators 816. Loops may be unrolled statically by the compiler, when possible. However, dynamically bounded loops (i.e., loop bound resolved before NUCD-block dispatch) can also be executed on an NUCD module. Unrolled loops and dynamically unroll-able loops with no inter-loop dependency (which may be determined by standard compiler techniques) may be marked within the header 806 as such.

Output register annotation 818. Optionally, output values computed by the NUCD modules may be written-back directly to registers of the host processor (without memory backing) from the NUCD block. Values to be stored to memory locations not currently in cache may be saved in a scratch pad and handled as non-temporal stores once exceptions/branches are cleared. Values may also be written back to non-register locations. For example, values may be written to a hardware first-in, first-out (FIFO) buffer or other hardware/software means of transmitting value to the main host.

NUCD block length (number of instructions) 820. The number of instructions in a NUCD block may be bounded to one or more cache lines or other length. This enables the scheduler to issue the full block of instructions, even if the full block hasn't yet been fetched from the instruction memory. This feature is especially useful for off-chip NUCD module.

Required Capabilities 822. Indicators of the processing capabilities needed to execute the NUCD block. For example, whether floating point, fixed point, or integer arithmetic is required. Capabilities 822 may also indicate specialized hardware such as accelerators, application specific processors, reconfigurable logic, or network interface controller.

The NUCD marker may be inserted by a compiler when higher level code is compiled into binary instructions. The conditions for breaking out code into a NUCD-block are largely compiler related, and potentially implementation dependent. The conditions could include (but not limited to): single entry, single exit register, limited in scope of access to a given number of multiple of cache lines or pages.

Each block identified by the NUCD start and end markers mentioned in the previous section is essentially a function. A first condition for executing that function is that the registers required are well defined before issuing the NUCD-block. In one embodiment the header containing the needed input registers goes through the renaming process to enable the processor to disambiguate the inputs to the NUCD-block. This has the effect of disentangling the registers in the NUCD block from the registers in other code, except for the explicitly marked input and output registers. This renaming process provides tighter control over the dependencies so that block can be processed in parallel.

A second condition for the executing the instruction is that accessed memory locations are clearly bounded. This enables off-chip NUCD modules lacking an memory management unit (MMU) may function using pre-calculated page-boundaries. This packaging of needed values is important for any NUCD module located outside the host.

Needed input arguments to the NUCD module may be sent using a stack-like packet. Packing values from current live registers into the packet enables those registers to be invalidated so that they may be re-used while the NUCD module is executing, without a need for further buffering.

Figure 9A:
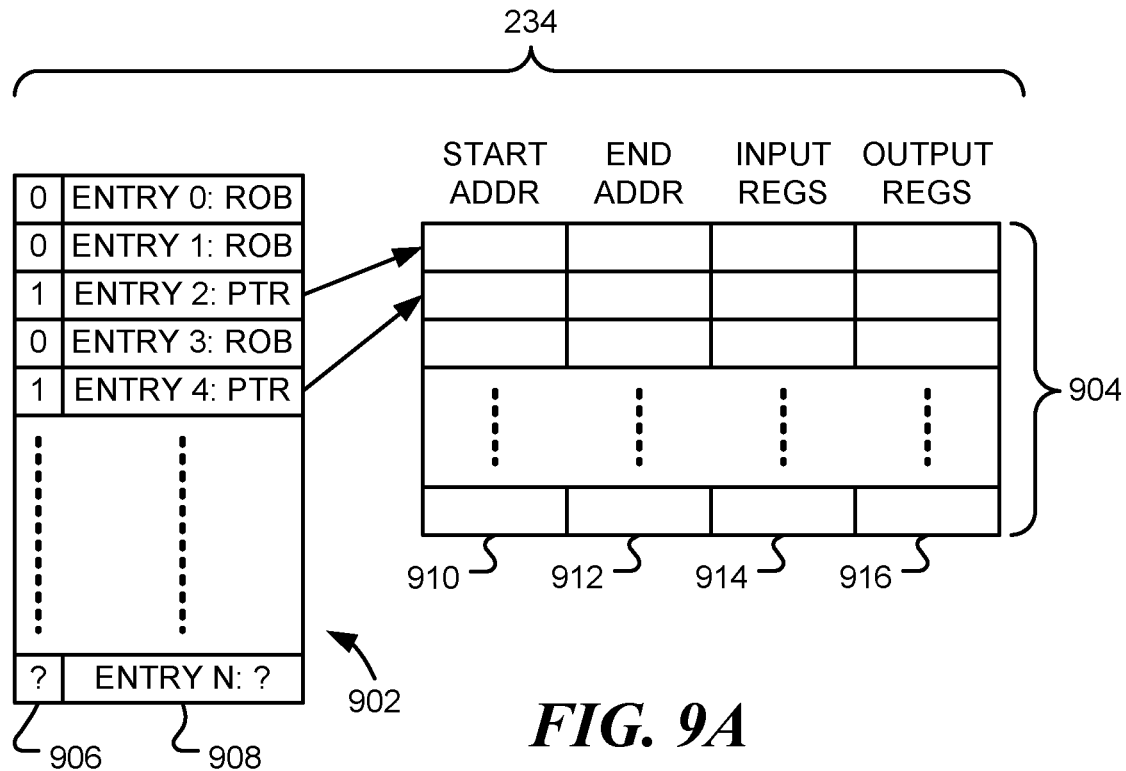
FIG. 9A and FIG. 9B are diagrammatic representations of modified reorder buffers (ROB's) in accordance with various representation embodiments.

FIG. 9A is a diagrammatic representation of a modified reorder buffer (ROB) 234 in accordance with embodiments of the disclosure. The reorder buffer 234 includes a first ROB 902 and one or more NUCD reorder buffers 904 associated with NUCD processing units. Each line in first ROB 902 includes an indicator bit 906 that indicates if the corresponding entry 908 is a standard ROB entry, or a pointer to an entry in NUCD reorder buffer 904. For example, in the first line of ROB 902, the indicator bit 906 is not set, so the entry 908 is a standard ROB entry. In the third line of ROB 902, the indicator bit 906 is set, so the entry 908 comprises a pointer to an entry in the NUCD reorder buffer 904.

Each line of NUCD reorder buffer 904 corresponds to a block of NUCD instructions. Field 910 indicates the start address of the NUCD instruction block and field 912 indicates the end address of the NUCD instruction block (or alternatively, the number of instructions). Field 914 is a bit map indicating which physical registers provide inputs to the NUCD instruction block and field 916 is a bit map indicating which physical registers, if any, will provide outputs from the NUCD instruction block. For example, if 64 registers are used, each field 914, 916 comprises a 64-bit number.

When the indicator bit 906 is not set, the entry 908 in the reorder buffer contains the information relating to a single instruction. Various configurations for single instruction reorder buffers are known, or will be apparent, to those of ordinary skill in the art. For example, the entry 908 may contain one or more of an instruction tag, a status value, a register identifier and a data value.

Figure 9B:
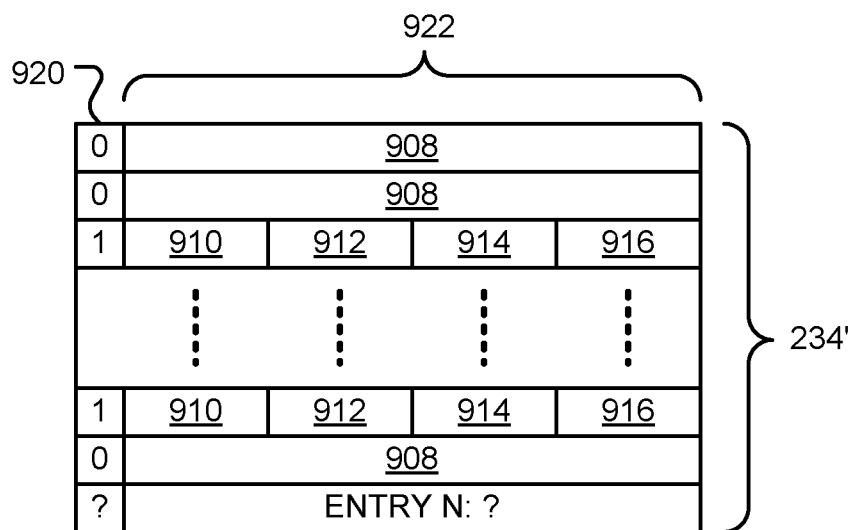

FIG. 9B is a diagrammatic representation of a modified reorder buffer (ROB) 234' in accordance with further embodiments of the disclosure. Each line in ROB 234' includes an indicator bit 920 that indicates if the corresponding entry 922 is a standard ROB entry for a single instruction, or an entry for an NUCD instruction block. For example, in the first line of ROB 234', the indicator bit 920 is not set, so the entry is a standard ROB entry 908. In the third line of ROB 234', the indicator bit 920 is set, so the entry comprises an entry for an NUCD instruction block. Each NUCD entry includes field 910 that indicates the start address of the NUCD instruction block and field 912 that indicates the end address of the NUCD instruction block (or alternatively, the number of instructions). Field 914 is a bit map indicating which physical registers provide inputs to the NUCD instruction block and field 916 is a bit map indicating which physical registers, if any, will provide outputs from the NUCD instruction block.

Figure 10:
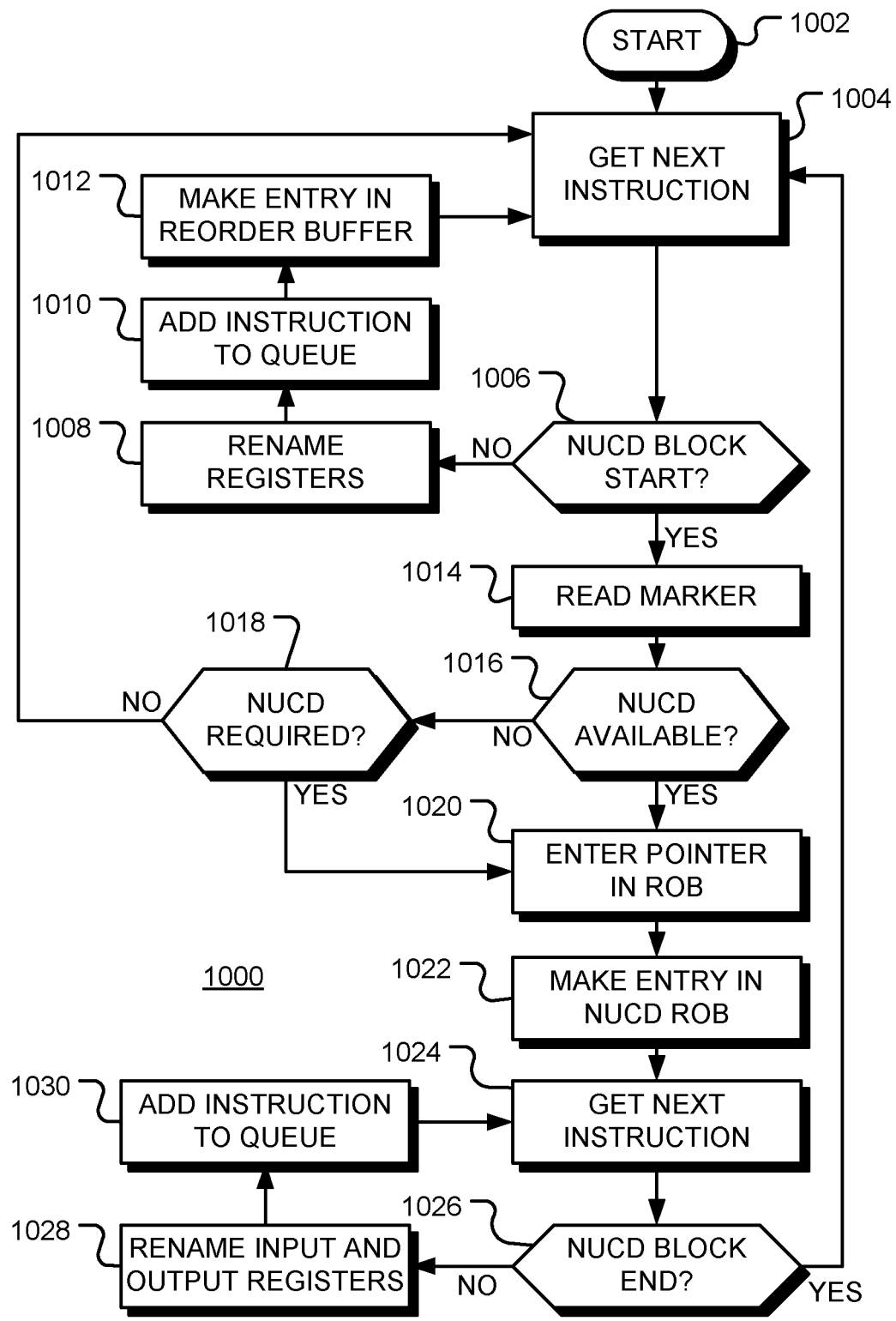
FIG. 10 is a flow chart of a method of operation of a non-uniform computer device (NUCD) in accordance with various representation embodiments.

FIG. 10 is a flow chart 1000 of a method of operation of a non-uniform computer device (NUCD) in accordance with embodiments of the disclosure. Following start block 1002, a new instruction a fetch circuit retrieves an instruction from memory at block 1004. If the instruction is not an NUCD start instruction, as depicted by the negative branch from decision block 1006, the register annotations of the architectural registers are renamed to physical register names at block 1008, the instruction is added to an instruction queue for the host processing unit at block 1010, and a corresponding entry is made into the reorder buffer at block 1012. The corresponding indicator bit is set to zero, and flow returns to block 1004.

If the instruction is an NUCD start instruction, as depicted by the positive branch from decision block 1006, the NUCD marker or header is read 1014 to determine NUCD requirements. If no suitable NUCD processing unit is available, as depicted by the negative branch from decision block 1016, a check is made at decision block 1018 to determine if a NUCD processing unit is required. For example, some custom instruction may not be suitable for computation by a host processing unit. If a NUCD processing unit is not required, as depicted by the negative branch from decision block 1018, flow returns to block 1004 and the instructions in the block will be processed as standard (non-NUCD) instructions. However, if a suitable NUCD processing unit is available, as depicted by the positive branch from decision block 1016, or if a NUCD processing unit is required, as depicted by the positive branch from decision block 1018, entries are made into the modified reorder buffer (234 in FIG. 9) at block 1020. For example, an indicator bit is set to 1 and a pointer to a line of a NUCD reorder buffer is entered. At block 1022, the start and end instruction addresses are entered into the NUCD reorder buffer, together with the bit maps corresponding to the input and output registers used. At block 1024 the next instruction in the block is retrieved. If the instruction is an NUCD block end instruction, as depicted by the positive branch from decision block 1026, flow returns to block 1004, otherwise, as depicted by the negative branch from decision block 1026, the input and output registers are renamed at block 1028 and the instruction is added to a selected instruction queue at block 1030. Other architectural register names are replaced in the NUCD processing unit. Alternatively, at block 1028, all of the registers may be renamed.

In this manner, standard host instructions and NUCD instructions may be combined into a single instruction stream. In additional, at least some NCUD instructions may be processed by a host processing unit when no NUCD is available.

Figure 11:
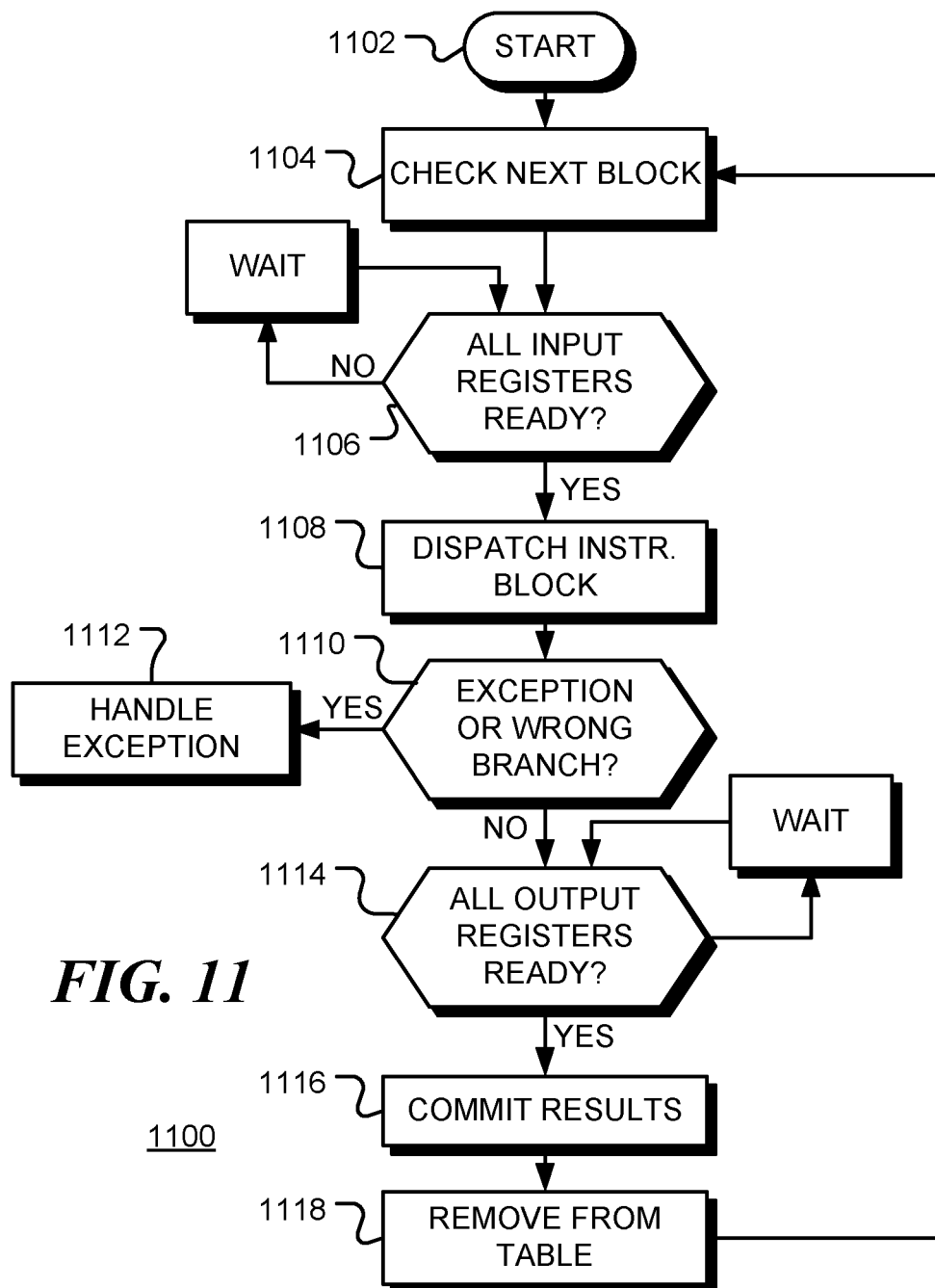
FIG. 11 is a flow chart of a further method of operation of a non-uniform computer device (NUCD) in accordance with various representation embodiments.

FIG. 11 is a flow chart 1100 of a method of operation of a non-uniform computer device (NUCD) in accordance with embodiments of the disclosure. The flow chart illustrates how instructions are issued and results committed. Following start block 1102, an entry of a NUCD reorder buffer is checked at block 1104. For example, the field 914 shown in FIG. 9 may be checked against register status bits. At decision block 1106, the process waits until all of the input registers are ready. When all of the input registers are ready, as depicted by the positive branch from decision block 1106, the corresponding block of instructions is dispatched to a NUCD processing unit at block 1108. If an exception or a branch misdirection occurs, as depicted by the positive branch from decision block 1110, the exception or misdirection is handled at block 1112. Otherwise, flow continues to decision block 1114. If all of the output registers have been filled, as depicted by the positive branch from decision block 1114, the results are committed at block 1116 and the corresponding entries are removed from the reorder buffers at block 1118. Flow then returns to block 1104.

In a conventional processor, memory order is managed via a memory order buffer or a load/store queue. In a non-uniform computing device, multiple processing units may perform load or store operations.

Figure 12:
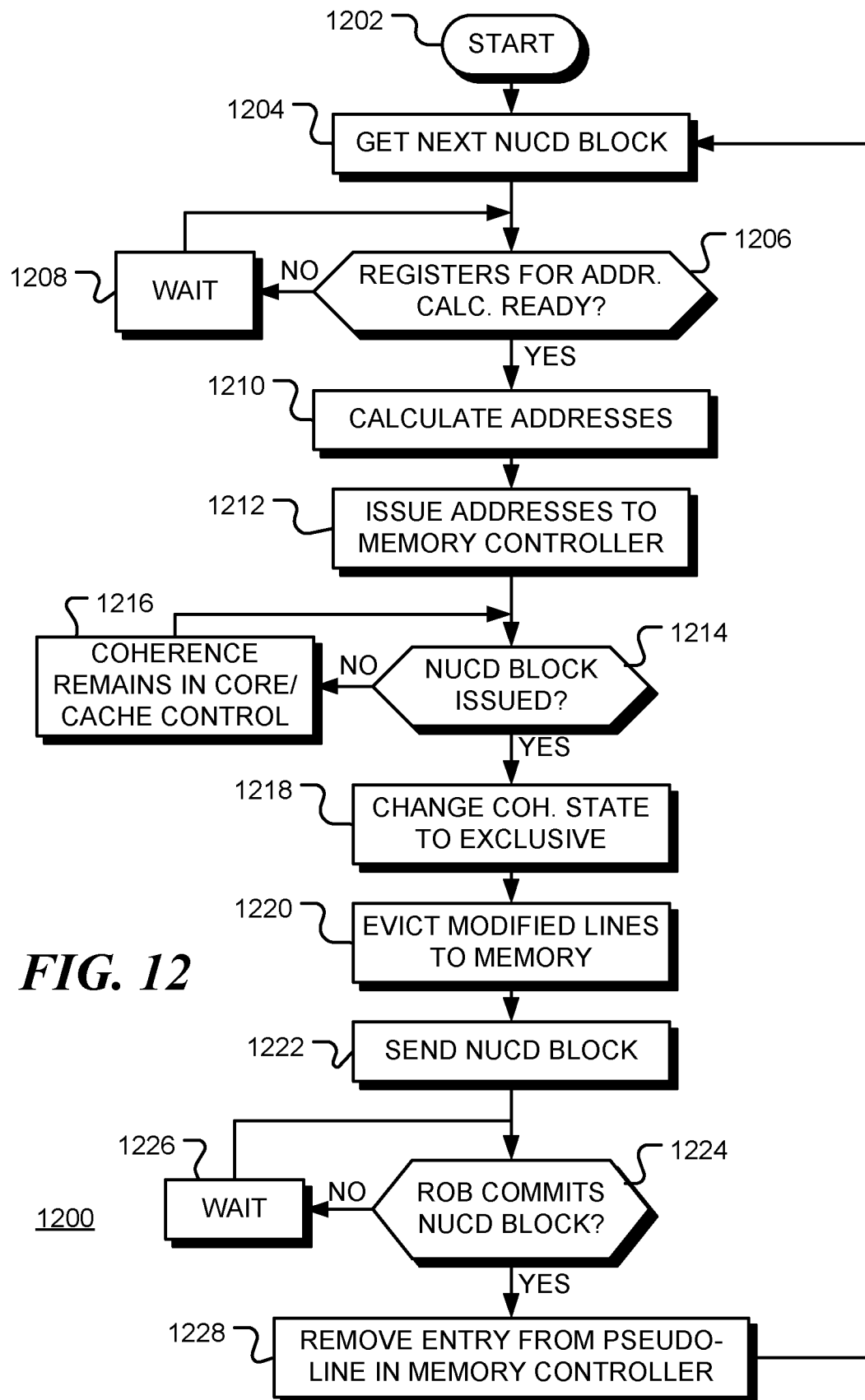
FIG. 12 is a flow chart of a method for maintaining memory order in a non-uniform computing device (NUCD), in accordance with various representation embodiments.

FIG. 12 is a flow chart 1200 of a method for maintaining memory order in a non-uniform computing device (NUCD), in accordance with embodiments of the disclosure. Following start block 1202, a block a NUCD instructions is retrieved at block 1204. If the register values needed to calculate the address of memory location accessed by the block of instruction are not available, as depicted by the negative branch from decision block 1206, operation waits at block 1208. When the needed register values are available, as depicted by the positive branch from decision block 1206, the addresses address are calculated at block 1210. These addresses are then issued to the memory controller at block 1212. The memory controller may then reserve a 'pseudo-line' of memory corresponding to the accessed memory locations As depicted by the negative branch from decision block 1214, and by block 1216, data coherence remains under the control of the host and cache controller until the block of NUCD instructions is issued to an NUCD issue queue. When the block of NUCD instructions is issued to a NUCD processing unit, as depicted by the positive branch from decision block 1214, the coherence state of the memory to be accessed is changed to 'exclusive' at block 1218. At block 1220, any cache data in a 'modified' state is evicted to memory and, at block 1222 the instructions are sent to the selected NUCD processing unit for execution. As indicated by the negative branch from decision block 1224 and wait block 1226, the process waits until the reorder buffer (ROB) commits the NUCD block. When the reorder buffer (ROB) commits the NUCD block, as depicted by the positive branch from decision block 1224, the pseudo-line of memory locations is released by the memory controller at block 1228. This method enable memory access order to be maintained.

In an alternative approach, when only a single host is present in the NUCD, an NUCD place holder may be inserted into the Load and Store Queue (LSQ) in the order of issue to act as a memory fence or block. Loads and stores to memory cannot proceed past the inserted place holder so that sequential consistency is maintained.

Those skilled in the art will recognize that the present invention may be implemented using a programmed processor, reconfigurable hardware components, dedicated hardware components or combinations thereof. Similarly, general purpose computers, microprocessor based computers, micro-controllers, optical computers, analog computers, dedicated processors and/or dedicated hard wired logic may be used to construct alternative equivalent embodiments of the present invention.

Further, the components of the data processing system described above may be described by instructions of a Hardware Description Language. These instructions may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, host memory and/or other equivalent storage technologies without departing from the present invention. Such alternative storage devices should be considered equivalents.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for maintaining data coherence in an apparatus comprising a host processor having a first processing unit, one or more near memory processing units, and a multi-level memory system having a plurality of logical levels, where a highest level of the memory system comprises an L1 cache accessible by the first processing unit, where a second level of the memory system, at a lower logical level of the multi-level memory system than the first level, comprises a second cache tightly coupled with a processing unit of the one or more near memory processing units, and where a third level of the memory system comprises a non-cache memory, the method comprising:
    loading a block of instructions to operate on first data;
    selecting, as a target processing unit, the first processing unit or a processing unit of the one or more near memory processing units, where the first data is stored at first data locations in a cache tightly coupled to the target processing unit and is associated with first memory addresses in the non-cache memory;
    issuing the block of instructions to the target processing unit;
    prior to executing the block of instructions by the target processing unit:
        backing up the first data to second data locations;
        blocking access to data associated with the first memory addresses by processing units other than the target processing unit;
        writing the first data having a modified state in the cache tightly coupled to the target processing unit to the non-cache memory; and
        setting the first data having an unmodified state in the cache tightly coupled to the target processing unit to a modified state; and
    executing, by the target processing unit, the block of instructions to:
        read the first data from the first data locations in the cache tightly coupled to the target processing unit;
        operate on the first data to produce second data; and
        write the second data to the cache tightly coupled to the target processing unit.

2. The method of claim 1, where a processing unit of the one or more near memory processing units is tightly coupled with the non-cache memory.

3. The method of claim 1, where backing up the first data comprises:
    allocating a scratch pad memory; and
    writing the first data to the scratch pad memory.

4. The method of claim 3, where the scratch pad memory is allocated in memory other than the the L1 cache or the second cache.

5. The method of claim 3, where the scratch pad memory is allocated in L1 cache or the second cache.

6. The method of claim 5, further comprising:
    invalidating any lines corresponding to the scratch pad memory at cache levels other than the level of the allocated scratch pad memory.

7. The method of claim 5, further comprising, when the second data are valid,
    storing the second data;
    unblocking access to data associated with the first memory addresses; and
    enabling access to the scratch pad memory.

8. The method of claim 1, further comprising, when the second data are valid, storing the second data; and
    unblocking access to data associated with the first memory addresses.

9. The method of claim 1, further comprising,
determining the second data to be invalid responsive to a signal from the host processor indicating an incorrectly predicted program branch.

10. The method of claim 1, further comprising,
determining the second data to be invalid responsive to an exception thrown by the target processing unit; and
signaling the host processor to indicate the exception.

11. The method of claim 1, where said operating on the first data by the target processing unit to produce second data comprises speculative execution of one or more instructions of a predicted program branch, the method further comprising:
determining the second data to be invalid when the program branch is predicted in error.

12. The method of claim 1, further comprising, when the second data are determined to be invalid:
copying the back-up first data from the second data locations to the first data locations.

13. The method of claim 1, further comprising, when the second data are determined to be invalid and the first data locations are in the cache tightly coupled to the target processing unit:
invalidating data stored at the first data locations.

14. The method of claim 1, where, when the first data locations are in the cache tightly coupled to the target processing unit, blocking access to the data associated with first memory addresses comprises:
a cache controller blocking access to the first data locations.

15. The method of claim 1, where the L1 cache and the second cache are parts of a multi-level inclusive cache and where blocking access to the data associated with first memory addresses comprises:
a cache controller blocking access to all levels of the multi-level inclusive cache that hold copies of the data associated with first memory addresses.

* * * * *